US011866624B2

(12) United States Patent
Choi et al.

(10) Patent No.: US 11,866,624 B2
(45) Date of Patent: Jan. 9, 2024

(54) NON-SOLVENT TYPE CURABLE COMPOSITION, CURED LAYER USING THE SAME, COLOR FILTER INCLUDING THE CURED LAYER, DISPLAY DEVICE INCLUDING THE CURED LAYER AND MANUFACTURING METHOD OF THE CURED LAYER

(71) Applicant: Samsung SDI Co., Ltd., Yongin-si (KR)

(72) Inventors: Mi Jeong Choi, Suwon-si (KR); Yonghee Kang, Suwon-si (KR); Dongjun Kim, Suwon-si (KR); Misun Kim, Suwon-si (KR); Jonggi Kim, Suwon-si (KR); Minjee Park, Suwon-si (KR); Bumjin Lee, Suwon-si (KR); Jihyeon Yim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 752 days.

(21) Appl. No.: 16/742,857

(22) Filed: Jan. 14, 2020

(65) Prior Publication Data

US 2020/0248068 A1    Aug. 6, 2020

(30) Foreign Application Priority Data

Feb. 1, 2019    (KR) ........................ 10-2019-0014094

(51) Int. Cl.
| | |
|---|---|
| *G02F 1/017* | (2006.01) |
| *C09K 11/02* | (2006.01) |
| *G02F 1/1335* | (2006.01) |
| *C08F 220/18* | (2006.01) |
| *C09D 11/38* | (2014.01) |
| *B82Y 30/00* | (2011.01) |
| *B82Y 40/00* | (2011.01) |
| *B82Y 20/00* | (2011.01) |

(52) U.S. Cl.
CPC .......... *C09K 11/025* (2013.01); *C08F 220/18* (2013.01); *G02F 1/017* (2013.01); *G02F 1/133514* (2013.01); *B82Y 20/00* (2013.01); *B82Y 30/00* (2013.01); *B82Y 40/00* (2013.01); *C09D 11/38* (2013.01); *G02F 1/01791* (2021.01); *G02F 2202/023* (2013.01); *G02F 2202/36* (2013.01)

(58) Field of Classification Search
CPC ....... C09K 11/025; C09K 11/02; C09K 11/08; C08F 220/18; C08F 122/1006; G02F 1/017; G02F 1/133514; G02F 1/01791; G02F 2202/023; G02F 2202/36; B82Y 20/00; B82Y 30/00; B82Y 40/00; C09D 11/38; C09D 4/00; C09D 11/101; C09D 11/322; C09D 11/30; C09D 11/10; G02B 5/20

USPC ........................................................ 524/423
See application file for complete search history.

(56) References Cited

U.S. PATENT DOCUMENTS

| | | | |
|---|---|---|---|
| 7,794,917 | B2 | 9/2010 | Mori et al. |
| 2001/0023078 | A1 | 9/2001 | Bawendi et al. |
| 2004/0007169 | A1 | 1/2004 | Ohtsu et al. |
| 2009/0212258 | A1 | 8/2009 | McCairn et al. |
| 2013/0345458 | A1 | 12/2013 | Freeman et al. |
| 2014/0192396 | A1 | 7/2014 | Schram et al. |
| 2014/0264196 | A1 | 9/2014 | Werner et al. |
| 2014/0275431 | A1 | 9/2014 | Freeman et al. |
| 2015/0267106 | A1 | 9/2015 | Pillay Narrainen et al. |
| 2016/0011506 | A1 | 1/2016 | Gu et al. |
| 2018/0102449 | A1 | 4/2018 | Pschenitzka et al. |
| 2018/0179441 | A1 | 6/2018 | Park et al. |
| 2018/0354244 | A1 | 12/2018 | Jen-La Plante et al. |
| 2018/0355244 | A1 | 12/2018 | Luchinger et al. |
| 2019/0011782 | A1 | 1/2019 | Pickett et al. |
| 2019/0077954 | A1 | 3/2019 | Tangirala et al. |
| 2019/0129302 | A1 | 5/2019 | Youn et al. |
| 2019/0278177 | A1 | 9/2019 | Jeong et al. |
| 2020/0248068 | A1 | 8/2020 | Choi et al. |
| 2020/0264461 | A1 | 8/2020 | Kuwana et al. |
| 2022/0213380 | A1* | 7/2022 | Kang .................... G02B 5/206 |

FOREIGN PATENT DOCUMENTS

| | | |
|---|---|---|
| CN | 101391756 A | 3/2009 |
| CN | 102086396 A | 6/2011 |
| CN | 102277158 A | 12/2011 |
| CN | 102517025 A | 6/2012 |

(Continued)

OTHER PUBLICATIONS

Beland, Vanessa, et al., "Antimony-Functionalized Phosphine-Based Photopolymer Networks," Angew. Chem., 2018, vol. 130, 5 pages.

International Search Report and Written Opinion of the International Searching Authority dated Apr. 13, 2020, for International Application No. PCT/KR2020/000037 (7 pages).

English translation of Japanese Decision for Grant for JP Application No. JP 2020-521309 dated Dec. 21, 2021, 3 pages.

English translation of Japanese Office Action for JP Application No. JP 2020-521309, dated Apr. 27, 2021, 4 pages.

English translation of Korean Intellectual Property Office Action for KR Application No. 10-2018-0023868 dated Jun. 1, 2020, 7 pages.

(Continued)

*Primary Examiner* — Prem C Singh
*Assistant Examiner* — Francis C Campanell
(74) *Attorney, Agent, or Firm* — Lewis Roca Rothgerber Christie LLP

(57) ABSTRACT

A non-solvent curable composition including a quantum dot and a polymerizable monomer having a carbon-carbon double bond at the terminal end and having a vapor pressure of about $1\times10^{-5}$ mmHg to about $1\times10^{-4}$ mmHg, a cured layer manufactured utilizing the non-solvent curable composition, a color filter including the cured layer, a display device including the color filter, and a method of manufacturing the cured layer are disclosed.

19 Claims, No Drawings

(56) References Cited

FOREIGN PATENT DOCUMENTS

| | | | |
|---|---|---|---|
| CN | 103896776 A | 7/2014 |
| CN | 105070849 A | 11/2015 |
| CN | 105131712 A | 12/2015 |
| CN | 105189584 A | 12/2015 |
| CN | 105247010 A | 1/2016 |
| CN | 106206972 A | 12/2016 |
| CN | 106468856 A | 3/2017 |
| CN | 106863935 A | 6/2017 |
| CN | 106957645 A | 7/2017 |
| CN | 108102640 A | 6/2018 |
| CN | 108219771 A | 6/2018 |
| CN | 108445713 A | 8/2018 |
| CN | 109476989 A | 3/2019 |
| CN | 109952359 A | 6/2019 |
| CN | 109994619 A | 7/2019 |
| CN | 110297391 A | 10/2019 |
| JP | 05-072723 A | 3/1993 |
| JP | 2002-121549 A | 4/2002 |
| JP | 2003-137912 A | 5/2003 |
| JP | 2009-132771 A | 6/2009 |
| JP | 2010-118434 A | 5/2010 |
| JP | 2011-122033 A | 6/2011 |
| JP | 2016-98375 A | 5/2016 |
| JP | 2016-519175 A | 6/2016 |
| JP | 2017-32918 A | 2/2017 |
| JP | 6093179 B2 | 3/2017 |
| JP | 2017-106006 A | 6/2017 |
| JP | 2017-137451 A | 8/2017 |
| JP | 6236412 B2 | 11/2017 |
| JP | 2018-91924 A | 6/2018 |
| JP | 2018-131613 A | 8/2018 |
| JP | 2018-153915 A | 10/2018 |
| JP | 2020-41080 A | 3/2020 |
| JP | 2020-105491 A | 7/2020 |
| JP | 2020-118971 A | 8/2020 |
| JP | 2021-501230 A | 1/2021 |
| KR | 1992-7002502 A | 9/1992 |
| KR | 1994-0005617 B1 | 6/1994 |
| KR | 1995-7000359 A | 1/1995 |
| KR | 1995-0011163 B1 | 9/1995 |
| KR | 10-2009-0078099 A | 7/2009 |
| KR | 10-2014-0072682 A | 6/2014 |
| KR | 10-2015-0023849 A | 3/2015 |
| KR | 10-2015-0052759 A | 5/2015 |
| KR | 10-2015-0098691 A | 8/2015 |
| KR | 10-2016-0022158 A | 2/2016 |
| KR | 10-2016-0097445 A | 8/2016 |
| KR | 10-2016-0114292 A | 10/2016 |
| KR | 10-2016-0119149 A | 10/2016 |
| KR | 10-2016-0135763 A | 11/2016 |
| KR | 10-2016-0142100 A | 12/2016 |
| KR | 10-2017-0006024 A | 1/2017 |
| KR | 10-2017-0022951 A | 3/2017 |
| KR | 10-2017-0028306 A | 3/2017 |
| KR | 10-2017-0035688 A | 3/2017 |
| KR | 10-2017-0047125 A | 5/2017 |
| KR | 10-2017-0060400 A | 6/2017 |
| KR | 10-2017-0073249 A | 6/2017 |
| KR | 10-2017-0075478 A | 7/2017 |
| KR | 10-2017-0101002 A | 9/2017 |
| KR | 10-2017-0106048 A | 9/2017 |
| KR | 10-2017-0106791 A | 9/2017 |
| KR | 10-2017-0141005 A | 12/2017 |
| KR | 10-2018-0025248 A | 3/2018 |
| KR | 10-2018-0027617 A | 3/2018 |
| KR | 10-2018-0059724 A | 6/2018 |
| KR | 10-2018-0080507 A | 7/2018 |
| KR | 10-2018-0092671 A | 8/2018 |
| KR | 10-2018-0106125 A | 10/2018 |
| KR | 10-2018-0111082 A | 10/2018 |
| KR | 10-1895909 B1 | 10/2018 |
| KR | 10-1909541 B1 | 10/2018 |
| KR | 10-2019-0004536 A | 1/2019 |
| KR | 10-2019-0007069 A | 1/2019 |
| KR | 10-2019-0062442 A | 6/2019 |
| KR | 10-1971586 B1 | 6/2019 |
| KR | 10-2019-0102857 A | 9/2019 |
| KR | 10-2019-0110935 A | 10/2019 |
| KR | 10-2019-0112631 A | 10/2019 |
| KR | 10-2020-0041937 A | 4/2020 |
| KR | 10-2020-0060430 A | 5/2020 |
| KR | 10-2226069 B1 | 3/2021 |
| KR | 10-2296792 B1 | 8/2021 |
| TW | 201213452 A1 | 4/2012 |
| TW | 201239044 A1 | 10/2012 |
| TW | 201243002 A1 | 11/2012 |
| TW | 201634604 A | 10/2016 |
| TW | 201643221 A | 12/2016 |
| TW | 201730671 A | 9/2017 |
| TW | 201809216 A | 3/2018 |
| TW | 201825648 A | 7/2018 |
| TW | 201835298 A | 10/2018 |
| TW | 201835652 A | 10/2018 |
| TW | 201920612 A | 6/2019 |
| TW | 201923461 A | 6/2019 |
| WO | WO 2000/017656 A1 | 3/2000 |
| WO | 2005/093422 A2 | 10/2005 |
| WO | 2017/002833 A1 | 1/2017 |
| WO | WO 2017/008442 A | 1/2017 |
| WO | WO 2017/019789 A1 | 2/2017 |
| WO | WO 2017/150112 A1 | 9/2017 |
| WO | 2018/051961 A1 | 3/2018 |
| WO | 2018/071308 A1 | 4/2018 |
| WO | 2018/105545 A1 | 6/2018 |
| WO | WO 2018/226925 A1 | 12/2018 |
| WO | WO 2019/084119 A1 | 5/2019 |
| WO | WO 2019-167751 A | 9/2019 |

OTHER PUBLICATIONS

English translation of Korean Notice of Allowance for KR Application No. 10-2018-0023867 dated Apr. 21, 2021, 2 pages.
English translation of Korean Notification of Third Party Observations for KR Application No. 10-2021-0088862 dated Jan. 26, 2022, 2 pages.
English translation of Korean Office Action for KR Application No. 10-2018-0023867 dated Aug. 19, 2020, 6 pages.
Korean Office Action for KR Application No. 10-2019-0007594 dated May 28, 2022, 8 pages.
Korean Office Action dated Dec. 28, 2022, issued in Korean Patent No. 10-2296792 (Korean Application No. 10-2019-0014094), 6 pages.
U.S. Notice of Allowance dated Jan. 19, 2023, issued in U.S. Appl. No. 16/155,691 (7 pages).
Japanese Notice of Allowance dated Feb. 21, 2023, issued in Japanese Patent Application No. 2021-121430 (3 pages).
Dawei Deng, et al., Forming highly fluorescent near-infrared emitting PbS quantum dots in water using glutathione as surface-modifying molecule, Journal of Colloid and Interface Science, 2012, pp. 234-240, vol. 367, Iss. 1, Elsevier Inc.
Ping, He, "Decorative Materials," 1st Edition, Southeast University Press, 2nd printing, Aug. 2002, Abstract, 5 pages.
Chengbin, Mu, "Communication Optical Fiber and Cable Materials and Industry Development," 1st Edition, Tongji University Press, Jun. 2015, Abstract, 4 pages.
Chinese Office Action dated Jun. 13, 2022, issued in corresponding Chinese Patent Application No. 202010042364.1 (8 pages).
U.S Restriction Requirement, dated Aug. 19, 2022, issued in U.S. Appl. No. 16/742,855 (7 pages).
English Abstract for foreign reference KR 10-2019-0102857 A.
English translation of Japanese Office Action, for Patent Application No. 2020-006789, dated Jan. 5, 2021, 3 pages.
English translation of Japanese Office Action, for Patent Application No. 2020-006789, dated Sep. 28, 2021, 3 pages.
English translation of Korean Office Action, for Patent Application No. 10-2019-0007594, dated May 7, 2021, 11 pages.
English translation of Korean Office Action, for Patent Application No. 10-2019-0014094, dated Feb. 28, 2021, 6 pages.

(56) References Cited

OTHER PUBLICATIONS

English translation of Korean Office Action, for Patent Application No. 10-2019-0047931, dated Jul. 22, 2021, 5 pages.
International Search Report issued in corresponding International Application No. PCT/KR2018/006007, dated Sep. 4, 2018, 3 pages.
Japanese Decision for grant dated Dec. 21, 2021, for Application No. JP 2020521309, 3 pages.
Japanese Office Action dated Apr. 27, 2021 for Application No. JP 2020-521309, 4 pages.
Korean Intellectual Property Office Action for corresponding Korean Patent Application No. 10-2018-0023868, dated Jun. 1, 2020, 7 pages.
Korean Notice of Allowance dated Apr. 21, 2021 for Application No. KR 10-2018-0023867, 2 pages.
Korean Notification of Third Party Observations, for Patent Application No. KR 10-20210088862, dated Jan. 26, 2022, 2 pages.
Korean Office Action dated Aug. 19, 2020, issued in corresponding Korean Patent Application No. 10-2018-0023867, 6 pages.
Office Action (including a search report) dated Dec. 29, 2021, of the corresponding Chinese Patent Application No. 201880063935.0, 13pp.
"Study on the properties of QDs with different ligand structures", May 26, 2013, 80pp.
Taiwanese Office Action dated Sep. 9, 2019, for corresponding Taiwanese Patent Application No. 107135471 (9 pages).
U.S. Office Action from Application No. 16/155,691, dated Aug. 27, 2021, 12 pages.
U.S. Office Action from U.S. Appl. No. 16/155,691, dated Dec. 13, 2021, 9 pages.
U.S. Restriction Requirement from U.S. Appl. No. 16/155,691, dated May 14, 2021, 6 pages.
Li Hua, et al., "Research Progress in Synthesis and Application of Quantum Dots," Journal of Jilin Institute of Architecture & Civil Engineering, Dec. 2014, 4 pages.
Chinese Office Action, Search Report, dated Feb. 25, 2023, issued in corresponding Chinese Patent Application No. 202010022282.0 (3 pages).
U.S. Office Action from U.S. Appl. No. 16/155,691, dated Apr. 11, 2022, 8 pages.
U.S. Office Action from U.S. Appl. No. 16/742,875, dated Apr. 11, 2022, 13 pages.
U.S. Restriction Requirement from U.S. Appl. No. 16/742,861, dated Apr. 28, 2022, 9 pages.
Beland, Vanessa A., et al., "Antimony-functionalized phosphine-based photopolymer networks," Angewandte Chemie International Edition, vol. 57, Issue 40, 2018, 7 pages.
Korean Office Action dated Jul. 22, 2021, issued in Korean Patent Application No. 10-2019-0047931 (4 pages).
Beland, Vanessa A., et al., "Antimony-functionalized phosphine-based photopolymer networks," Angewandte Chemie International Edition, 2018, 7 pages.
Taiwanese Office Action dated Dec. 2, 2020, issued in Taiwanese Patent Application No. 109101093 (6 pages).
Notice of Allowance for U.S. Appl. No. 16/155,691 dated Jul. 14, 2022, 8 pages.
Office Action for U.S. Appl. No. 16/742,861 dated Jul. 12, 2022, 9 pages.
Office Action for U.S. Appl. No. 16/742,875 dated Jul. 18, 2022, 10 pages.
Notice of Allowance for U.S. Appl. No. 16/742,861 dated Nov. 9, 2022, 10 pages.
Notice of Allowance for U.S. Appl. No. 16/742,875 dated Nov. 3, 2022, 7 pages.
Office Action for U.S. Appl. No. 16/742,855 dated Dec. 2, 2022, 15 pages.
Japanese Office Action dated Sep. 28, 2021, issued in corresponding Japanese Patent Application No. 2020-006789 (3 pages).
Japanese Office Action dated Feb. 16, 2021, issued in Japanese Patent Application Appl. No. 2020-029726 (3 pages).
Taiwanese Office Action dated Feb. 22, 2021, issued in Taiwanese Patent Application No. 109101173 (9 pages).
Korean Office Action dated Feb. 28, 2021, issued in corresponding Korean Patent Application No. 10-2019-0014094 (6 pages).
Third Party Observations dated Aug. 2, 2022, issued in Korean Patent Application No. 10-2021-0088862 (2 pages).
Korean Office Action, with English translation, dated Mar. 28, 2022 for Korean Patent Application No. 10-2019-0007594 (17 pages).
U.S. Notice of Allowance dated Oct. 20, 2022, issued in U.S. Appl. No. 16/155,691 (8 pages).
Taiwanese Patent Office Action and Search Report for corresponding Taiwanese Patent Application No. 109101173, dated Jul. 23, 2020, 14 pages.
Taiwanese Patent Office Action and Search Report for corresponding Taiwanese Patent Application No. 109101997, dated Jul. 23, 2020, 16 pages.
Chinese Office Action dated Dec. 1, 2021, of the corresponding Chinese Patent Application No. 202010042364.1. (9 pages).
Breus, Vladimir V., et al., "Quenching of CdSe—ZnS Core-Shell Quantum Dot Luminescence by Water-Soluble Thiolated Ligands," J. Phys. Chem. C, 2007, pp. 18589-18594.
Zhu, Huaping, et al., "Synthesis and Optical Properties of Thiol Functionalized CdSe/ZnS(Core/Shell) Quantum Dots by Ligand Exchange," Journal of Nanomaterials, 2014, 15 pages.
Chinese Notice of Allowance dated Oct. 21, 2022, issued in Chinese Patent Application No. 201880063935.0 (5 pages).
Japanese Office Action dated Jan. 5, 2021, issued in Japanese Patent Application No. 2020-006250 (4 pages).
Japanese Office Action dated Jan. 5, 2021, issued in corresponding Japanese Patent Application No. 2020-006786 (3 pages).
Korean Office Action dated May 7, 2021, issued in Korean Patent Application No. 10-2019-0007594 (10 pages).
Korean Notice of Allowance dated Jun. 18, 2021, issued in corresponding Korean Patent Application No. 10-2019-0014094 (2 pages).
U.S. Final Office Action dated Apr. 28, 2023, issued in U.S. Appl. No. 16/742,855 (18 pages).
International Search Report for corresponding PCT International Application No. PCT/KR2020/012595 dated Dec. 24, 2020, 4pp.
Varga, Krisztina et al.; "CdSe Quantum Dots Functionalized with Chiral, Thiol-Free Carboxylic Acids: Unraveling Structural Requirements for Ligand-Induced Chirality"; ACS Nano 2017; 11; pp. 9846-9853.
Yoon, Cheolsang, et al., "High luminescence efficiency white light emitting diodes based on surface functionalized quantum dots dispersed in polymer matrices," Colloids and Surfaces A: Physicochem. Eng. Aspects 428 (2013) 86-91. (Year: 2013).
U.S. Office Action dated Aug. 4, 2023, issued in U.S. Appl. No. 16/742,855 (15 pages).
U.S. Office Action dated Dec. 14, 2021, issued in U.S. Appl. No. 16/742,875 (12 pages).
Chinese Office Action dated Jun. 16, 2023, issued in Chinese Patent Application No. 202010036364.0 (8 pages).

* cited by examiner

NON-SOLVENT TYPE CURABLE COMPOSITION, CURED LAYER USING THE SAME, COLOR FILTER INCLUDING THE CURED LAYER, DISPLAY DEVICE INCLUDING THE CURED LAYER AND MANUFACTURING METHOD OF THE CURED LAYER

CROSS-REFERENCE TO RELATED APPLICATION

This application claims priority to and the benefit of Korean Patent Application No. 10-2019-0014094, filed in the Korean Intellectual Property Office on Feb. 1, 2019, the entire content of which is incorporated herein by reference.

BACKGROUND

1. Field

This disclosure relates to a non-solvent curable composition, a cured layer manufactured utilizing the same, a color filter including the cured layer, a display device including the cured layer, and a method of manufacturing the cured layer.

2. Description of the Related Art

In the case of general (e.g., related art) quantum dots, due to hydrophobic surface characteristics, a solvent in which the quantum dots can be dispersed is limited. Thus, it is difficult to introduce (e.g., add) the quantum dots into a polar system such as a binder or a curable monomer.

For example, even in the case of a quantum dot ink composition (which is being actively researched), a polarity thereof is relatively low in an initial step and it may be dispersed in a solvent utilized in the curable composition having a high hydrophobicity. Because it is difficult to increase quantum dots to be 20 wt % or more based on a total amount of the composition, it is therefore difficult (e.g., impossible) to increase light efficiency (e.g., luminous efficiency, quantum efficiency, etc.) of the ink over a certain level. Even though quantum dots are additionally added and dispersed in order to increase light efficiency, a viscosity exceeds a range (e.g., 12 cPs) capable of ink-jetting and processability may be unsatisfactory. That is, when the viscosity of the quantum dot ink composition exceeds the range suitable (e.g., 12 cPs) for ink-jet printing due to the addition of additional quantum dots, processability may be compromised.

In order to achieve the viscosity range capable of (e.g., suitable for) ink-jetting, a method of lowering an ink solid content by dissolving (e.g., adding) 50 wt % or more of a solvent based on a total amount of the composition has been utilized, which also provides a somewhat satisfactory result in terms of viscosity. However, it may be considered to be a satisfactory result in terms of viscosity, but nozzle drying (due to solvent volatilization (e.g., evaporation)), nozzle clogging, reduction of a layer (e.g., reduction of a layer thickness) as time passed after jetting may become worse and it is difficult to control a thickness deviation after curing. Thus, it is difficult to apply it (e.g., this method) to actual processes.

Therefore, the quantum dot ink is desirably a non-solvent composition that does not include a solvent and is the embodied (e.g., most preferable) form to be applied to an actual process. The current technique of applying a quantum dot itself to a solvent-based composition is now limited to a certain extent.

Currently, the embodied (e.g., most preferred) solvent-based composition to be applied to actual processes is that the quantum dots, which are not surface-modified, such as ligand-substitution, are included in a content of about 20 wt % to 25 wt % based on a total amount of the solvent-based composition. Therefore, it is difficult to increase light efficiency and absorption rate due to the viscosity limitation. Meanwhile, attempts have been made to lower the quantum dot content and increase the content of the light diffusing agent (scatterer) in other improvement directions, but this has also failed to solve a sedimentation problem and a low light efficiency problem.

SUMMARY

An aspect according to embodiments of the present disclosure is directed toward providing a non-solvent curable composition.

Another aspect according to embodiments of the present disclosure is directed toward providing a cured layer manufactured utilizing the composition.

Another aspect according to embodiments of the present disclosure is directed toward providing a color filter including the cured layer.

Another aspect according to embodiments of the present disclosure is directed toward providing a display device including the cured layer and/or the color filter.

Another aspect according to embodiments of the present disclosure is directed toward providing a method of manufacturing the cured layer.

According to an embodiment, a non-solvent curable composition includes a quantum dot and a polymerizable monomer having a carbon-carbon double bond at a terminal end of the polymerizable monomer and having a vapor pressure of about $1 \times 10^{-5}$ mmHg to about $1 \times 10^{-4}$ mmHg.

The polymerizable monomer may be about 40 wt % to about 80 wt % in amount based on a total weight of the non-solvent curable composition.

The polymerizable monomer may be represented by Chemical Formula 15.

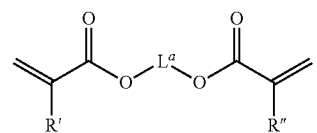

Chemical Formula 15

In Chemical Formula 15,
R' and R'' are each independently a hydrogen atom or a substituted or unsubstituted C1 to C20 alkyl group, and
$L^a$ is a substituted or unsubstituted C5 to C20 alkylene group.

The quantum dot may be a quantum dot surface-modified with one or more of compounds represented by Chemical Formula 1 to Chemical Formula 14.

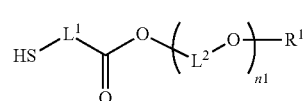

Chemical Formula 1

-continued

Chemical Formula 2

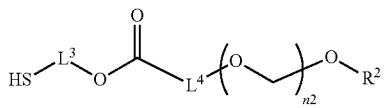

Chemical Formula 3

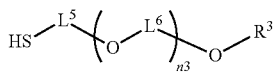

Chemical Formula 4

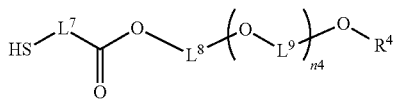

Chemical Formula 5

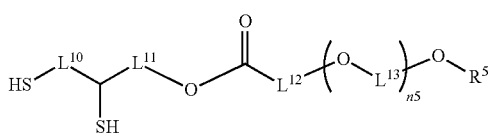

Chemical Formula 6

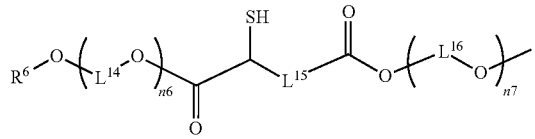

In Chemical Formula 1 to Chemical Formula 6,
$R^1$ to $R^7$ are each independently a substituted or unsubstituted C1 to C10 alkyl group or a substituted or unsubstituted C6 to C20 aryl group,
$L^1$ to $L^{16}$ are each independently a substituted or unsubstituted C1 to C10 alkylene group, and
n1 to n7 are each independently an integer of 0 to 10.

Chemical Formula 7

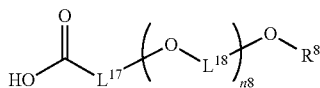

Chemical Formula 8

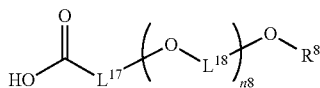

Chemical Formula 9

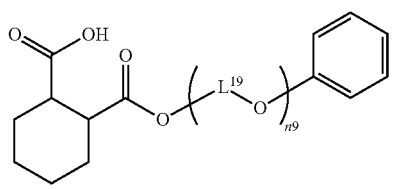

In Chemical Formula 7 to Chemical Formula 9,
$R^8$ and $R^9$ are each independently a substituted or unsubstituted C1 to C10 alkyl group,
$L^{17}$ to $L^{23}$ are each independently a substituted or unsubstituted C1 to C10 alkylene group, and
n8 to n10 are each independently an integer of 0 to 10.

Chemical Formula 10

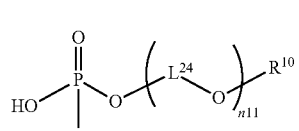

Chemical Formula 11

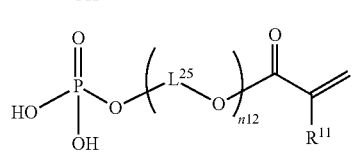

Chemical Formula 12

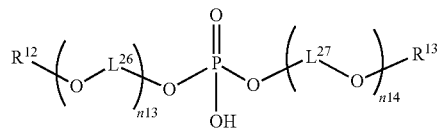

Chemical Formula 13

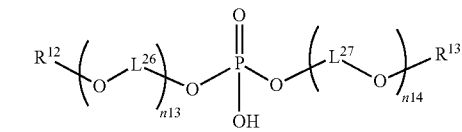

In Chemical Formula 10 to Chemical Formula 13,
$R^{10}$ to $R^{15}$ are each independently a hydrogen atom or a substituted or unsubstituted C1 to C10 alkyl group,
$L^{24}$ to $L^{29}$ are each independently a substituted or unsubstituted C1 to C10 alkylene group, and
n11 to n16 are each independently an integer of 0 to 10.

Chemical Formula 14

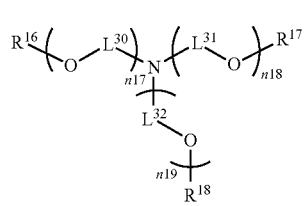

In Chemical Formula 14,
$R^{16}$ to $R^{18}$ are each independently a substituted or unsubstituted C1 to C10 alkyl group,
$L^{30}$ to $L^{32}$ are each independently a substituted or unsubstituted C1 to C10 alkylene group, and
n17 to n19 are each independently an integer of 0 to 10.

The quantum dot may have a maximum fluorescence emission wavelength at about 500 nm to about 680 nm.

The non-solvent curable composition may further include a polymerization initiator, a light diffusing agent, or a combination thereof.

The light diffusing agent may be barium sulfate, calcium carbonate, titanium dioxide, zirconia, or a combination thereof.

The non-solvent curable composition may further include a polymerization inhibitor; malonic acid; 3-amino-1,2-propanediol; a silane-based coupling agent; a leveling agent; a fluorine-based surfactant; or a combination thereof.

The non-solvent curable composition may have a photocure rate of greater than or equal to about 90% after being applied on a substrate at a thickness of about 2 μm to about 20 μm and photocured.

The non-solvent curable composition may have a film residue rate of greater than or equal to about 80% at 60 minutes after being applied on a substrate at a thickness of about 2 μm to about 20 μm.

According to another embodiment, a cured layer manufactured utilizing the non-solvent curable composition is provided.

According to another embodiment, a color filter including the cured layer is provided.

According to another embodiment, a display device including the cured layer and/or the color filter is provided.

According to another embodiment, a method of manufacturing a cured layer includes applying the non-solvent curable composition onto a substrate by an ink-jet method to form a pattern; and curing the pattern.

The curing may be photocuring and/or thermal curing.

Other embodiments of the present disclosure are included in the following detailed description.

The non-solvent curable composition according to embodiments of the present disclosure has an excellent cure rate and film residue rate, and has a viscosity capable of (e.g., suitable for) ink-jetting at room temperature.

DETAILED DESCRIPTION

Hereinafter, embodiments of the present disclosure are described in more detail. However, these embodiments are exemplary, the present disclosure is not limited thereto and the subject matter of the present disclosure is defined by the scope of claims, and equivalents thereof.

As used herein, when specific definition is not otherwise provided, the term "alkyl group" refers to a C1 to C20 alkyl group, the term "alkenyl group" refers to a C2 to C20 alkenyl group, the term "cycloalkenyl group" refers to a C3 to C20 cycloalkenyl group, the term "heterocycloalkenyl group" refers to a C2 to C20 heterocycloalkenyl group, the term "aryl group" refers to a C6 to C20 aryl group, the term "arylalkyl group" refers to a C6 to C20 arylalkyl group, the term "alkylene group" refers to a C1 to C20 alkylene group, the term "arylene group" refers to a C6 to C20 arylene group, the term "alkylarylene group" refers to a C6 to C20 alkylarylene group, the term "heteroarylene group" refers to a C3 to C20 heteroarylene group, and the term "alkoxylene group" refers to a C1 to C20 alkoxylene group.

As used herein, when specific definition is not otherwise provided, the term "substituted" refers to replacement of at least one hydrogen atom by a substituent selected from a halogen atom (F, Cl, Br, or I), a hydroxyl group, a C1 to C20 alkoxy group, a nitro group, a cyano group, an amine group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C20 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, a C3 to C20 heteroaryl group, and a combination thereof.

As used herein, when specific definition is not otherwise provided, the term "hetero" refers to inclusion of at least one heteroatom selected from N, O, S, and P, in addition to carbon atom(s), in the chemical formula.

As used herein, when specific definition is not otherwise provided, the term "(meth)acrylate" refers to both "acrylate" and "methacrylate", and the term "(meth)acrylic acid" refers to both "acrylic acid" and "methacrylic acid".

As used herein, when specific definition is not otherwise provided, the term "combination" refers to mixing or copolymerization.

As used herein, when a definition is not otherwise provided, hydrogen is bonded at the position where a chemical bond is supposed to exist but not drawn in a chemical formula.

As used herein, a cardo-based resin refers to a resin including at least one functional group represented by one selected from Chemical Formula 16-1 to Chemical Formula 16-11 in the backbone of the resin.

In addition, in the present specification, when a definition is not otherwise provided, "*" refers to a linking point with the same or different atom or chemical formula.

An embodiment relates to a non-solvent curable composition including a quantum dot. In one embodiment, the quantum dot-containing curable composition (ink) has been developed to include (e.g., specifically utilize) a thiol binder or monomer (a resin for a quantum dot sheet (film) including 4T (e.g., monomer with four thiol groups)) that has good compatibility with the quantum dot.

On the other hand, because a generally and widely utilized polymerizable monomer, an -ene-based monomer (including a vinyl-based monomer, an acrylate-based monomer, a methacrylate-based monomer, and/or the like which cover (e.g., includes) from a mono-functional monomer to a multi-functional monomer) has low compatibility with the quantum dot and is limited in terms of dispersibility of the quantum dot, various developments for usefully applying it to the quantum dot-containing curable composition are substantially difficult. In addition, the -ene-based monomer does not show high concentration quantum dot dispersibility and thus has difficulties in being applied to (e.g., included in) the quantum dot-containing curable composition.

Because of this drawback, the quantum dot-containing curable composition has been developed to have a composition including a solvent in a considerable amount (greater than or equal to about 50 wt %). But when the solvent content is increased, ink-jetting processability may be deteriorated. Accordingly, in order to satisfy the ink-jetting processability, a demand for a non-solvent curable composition is continuously increased.

An embodiment of the present disclosure relates to the increasing demand for the non-solvent curable composition, which may have an effect (e.g., a passivation effect) of not deteriorating inherent optical characteristics of the quantum dot as well as providing high concentration dispersibility of the quantum dots even in a solvent-free system (by including the polymerizable monomer having a carbon-carbon double bond at the terminal end and having a vapor pressure at about 20° C. to about 25° C. of about $1 \times 10^{-5}$ mmHg to about $1 \times 10^{-4}$ mmHg along with the quantum dot) and thus improving affinity of the quantum dots to the curable composition.

Hereinafter, each component is specifically described in more detail.

Quantum Dot

A quantum dot included in a non-solvent curable composition according to an embodiment may be a quantum dot surface-modified with one or more of compounds represented by Chemical Formula 1 to Chemical Formula 14, but the present disclosure is not necessarily limited thereto.

In other words, the quantum dot included in the non-solvent curable composition according to an embodiment may be a quantum dot that is surface-modified with a ligand having a polar group, i.e., a ligand having high affinity to a polymerizable monomer having a carbon-carbon double bond at the terminal end and having a vapor pressure at about 20° C. to about 25° C. of less than or equal to about $1 \times 10^{-4}$ mmHg, for example, about $1 \times 10^{-5}$ mmHg to about $1 \times 10^{-4}$ mmHg. In the case of the above-described surface-modified quantum dots, it is easy (e.g., very easy) to produce high-concentration or highly-concentrated quantum dot dispersion (with improvement of dispersibility of quantum dots for monomers), thereby realizing a non-solvent ink composition and significantly (e.g., greatly) improving light efficiency.

For example, the ligand having the polar group may have a structure having a high affinity to a chemical structure of the monomer including the compound having the carbon-carbon double bond.

For example, the ligand having the polar group may be represented by one of Chemical Formula 1 to Chemical Formula 14, but the present disclosure is not necessarily limited thereto.

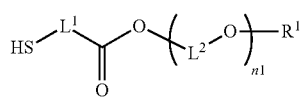

Chemical Formula 1

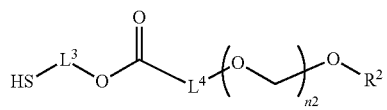

Chemical Formula 2

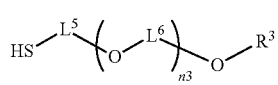

Chemical Formula 3

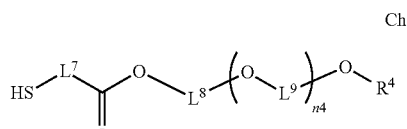

Chemical Formula 4

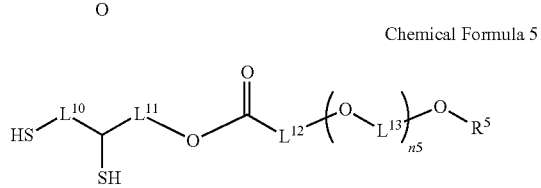

Chemical Formula 5

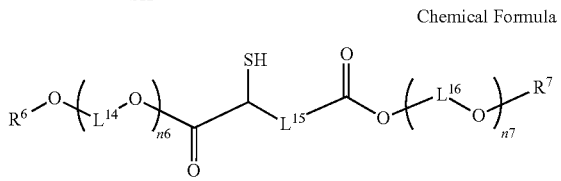

Chemical Formula 6

In Chemical Formula 1 to Chemical Formula 6,
$R^1$ to $R^7$ are each independently a substituted or unsubstituted C1 to C10 alkyl group or a substituted or unsubstituted C6 to C20 aryl group,
$L^1$ to $L^{16}$ are each independently a substituted or unsubstituted C1 to C10 alkylene group, and
n1 to n7 are each independently an integer of 0 to 10.

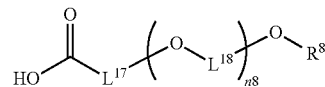

Chemical Formula 7

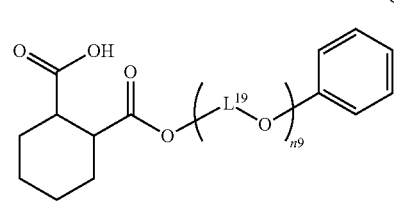

Chemical Formula 8

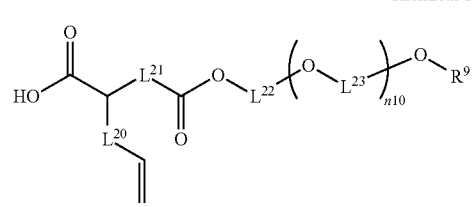

Chemical Formula 9

In Chemical Formula 7 to Chemical Formula 9,
$R^8$ and $R^9$ are each independently a substituted or unsubstituted C1 to C10 alkyl group,
$L^{17}$ to $L^{23}$ are each independently a substituted or unsubstituted C1 to C10 alkylene group, and
n8 to n10 are each independently an integer of 0 to 10.

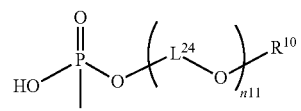

Chemical Formula 10

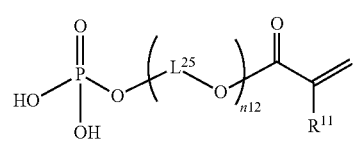

Chemical Formula 11

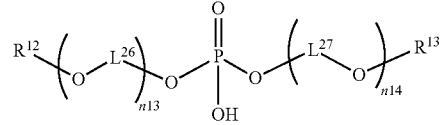

Chemical Formula 12

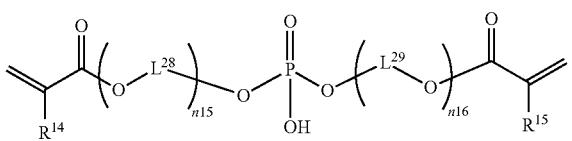

Chemical Formula 13

In Chemical Formula 10 to Chemical Formula 13,
$R^{10}$ to $R^{15}$ are each independently a hydrogen atom or a substituted or unsubstituted C1 to C10 alkyl group,
$L^{24}$ to $L^{29}$ are each independently a substituted or unsubstituted C1 to C10 alkylene group, and
n11 to n16 are each independently an integer of 0 to 10.

Chemical Formula 14

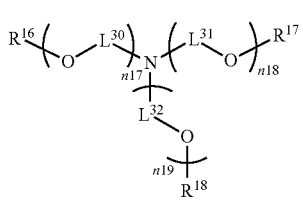

In Chemical Formula 14,
$R^{16}$ to $R^{18}$ are each independently a substituted or unsubstituted C1 to C10 alkyl group,
$L^{30}$ to $L^{32}$ are each independently a substituted or unsubstituted C1 to C10 alkylene group, and
n17 to n19 are each independently an integer of 0 to 10.

For example, the compound represented by Chemical Formula 1 to Chemical Formula 14 may be one of compounds represented by Chemical Formula A to Chemical Formula P, but the present disclosure is not necessarily limited thereto.

Chemical Formula A

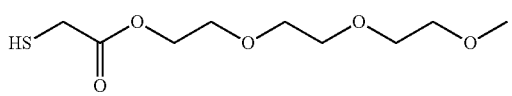

Chemical Formula B

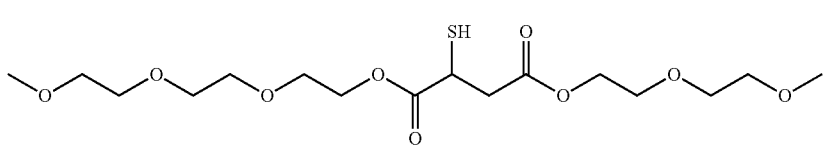

Chemical Formula C

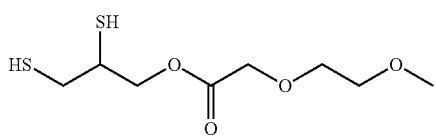

Chemical Formula D

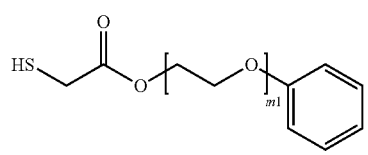

In Chemical Formula D, m1 is an integer of 0 to 10.

Chemical Formula E

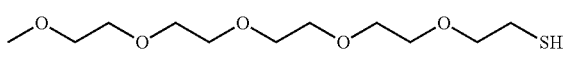

Chemical Formula F

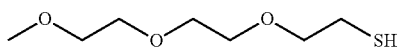

Chemical Formula G

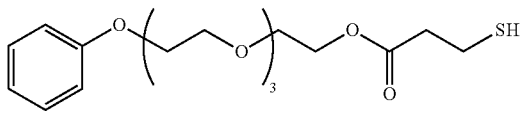

Chemical Formula H

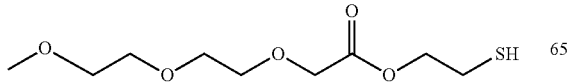

Chemical Formula I

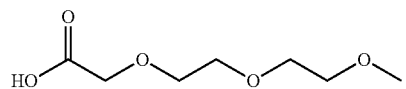

Chemical Formula J

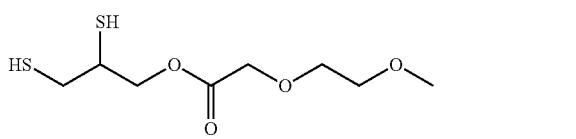

Chemical Formula K

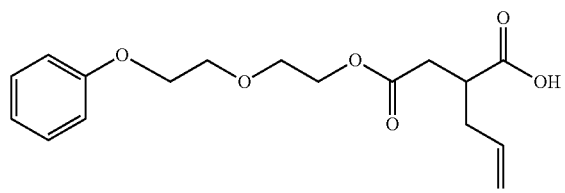

Chemical Formula L

Chemical Formula M

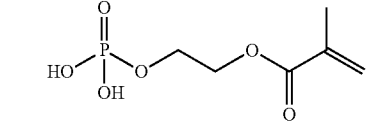

-continued

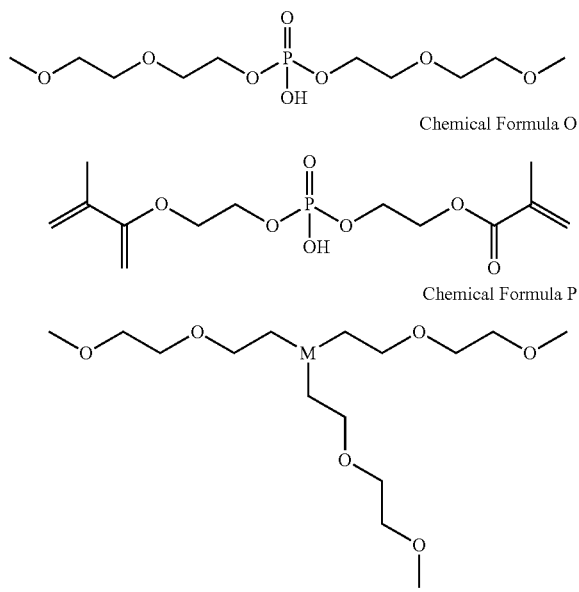

Chemical Formula N

Chemical Formula O

Chemical Formula P

In case that the ligand is utilized, it is easier to surface-modify the quantum dot. When the quantum dot surface-modified with the aforementioned ligand is added to the aforementioned monomers and is stirred, a transparent (e.g., very transparent) dispersion may be obtained, which is a measure to confirm that the quantum dot is well surface-modified.

For example, the quantum dot absorbs light in a wavelength region of about 360 nm to about 780 nm, for example, about 400 nm to about 780 nm, and emits fluorescence in a wavelength region of about 500 nm to about 700 nm, for example, about 500 nm to about 580 nm, or about 600 nm to about 680 nm. That is, the quantum dot may have a maximum fluorescence emission wavelength ($\lambda_{em}$) at about 500 nm to about 680 nm.

The quantum dots may each independently have a full width at half maximum (FWHM) of about 20 nm to about 100 nm, for example, about 20 nm to about 50 nm. When the quantum dot has a full width at half maximum (FWHM) of these ranges, color reproducibility is increased when utilized as a color material in a color filter due to high color purity.

The quantum dots may each independently be an organic material, an inorganic material, or a hybrid (mixture) of an organic material and an inorganic material.

The quantum dots may each independently include (e.g., be composed of) a core and a shell around (e.g., surrounding) the core, and the core and the shell may each independently have a structure of a core, core/shell, core/first shell/second shell, alloy, alloy/shell, and/or the like composed of Group II-IV elements, Group III-V elements, and/or the like, but the present disclosure is not limited thereto.

For example, the core may include at least one material selected from CdS, CdSe, CdTe, ZnS, ZnSe, ZnTe, HgS, HgSe, HgTe, GaN, GaP, GaAs, InP, InAs, and an alloy thereof, but the present disclosure is not necessarily limited thereto. The shell around (e.g., surrounding) the core may include at least one material selected from CdSe, ZnSe, ZnS, ZnTe, CdTe, PbS, TiO, SrSe, HgSe, and an alloy thereof, but the present disclosure is not necessarily limited thereto.

In an embodiment, because an interest in the environment has recently been much increased over the whole world, and a regulation of a toxic material has also been fortified (e.g., tightened), a non-cadmium-based light emitting material (InP/ZnS, InP/ZnSe/ZnS, etc.) having slightly lower (e.g., little low) quantum efficiency (quantum yield) but being environmentally-friendly (instead of a light emitting material having a cadmium-based core) is utilized, but the present disclosure is not necessarily limited thereto.

The quantum dots of the core/shell structure may have an entire size including the shell (an average particle diameter) of about 1 nm to about 15 nm, for example, about 5 nm to about 15 nm.

For example, the quantum dots may each independently include a red quantum dot, a green quantum dot, or a combination thereof. The red quantum dots may each independently have an average particle diameter of about 10 nm to about 15 nm. The green quantum dots may each independently have an average particle diameter of about 5 nm to about 8 nm.

Also, for dispersion stability of the quantum dots, the non-solvent ink composition according to an embodiment may further include a dispersing agent. The dispersing agent helps with the uniform dispersibility of a photo-conversion material such as a quantum dot in the non-solvent ink composition and may include a non-ionic, anionic, and/or cationic dispersing agent. For example, the dispersing agent may be polyalkylene glycol or esters thereof, a polyoxy alkylene, a polyhydric alcohol ester alkylene oxide addition product, an alcohol alkylene oxide addition product, a sulfonate ester, a sulfonate salt, a carboxylate ester, a carboxylate salt, an alkyl amide alkylene oxide addition product, an alkyl amine and/or the like, and may be utilized alone or in a mixture of two or more. The dispersing agent may be utilized in an amount of about 0.1 wt % to about 100 wt %, for example, about 10 wt % to about 20 wt %, relative to a solid content of the photo-conversion material such as quantum dots.

The quantum dots, for example, the surface-modified quantum dots, may be included in an amount of about 1 wt % to about 40 wt %, for example, about 3 wt % to about 30 wt %, based on a total amount of the non-solvent curable composition. When the quantum dots, for example, the surface-modified quantum dots, are included within these ranges, a photo-conversion rate may be improved, and pattern characteristics and development characteristics may not be interfered with, so that the non-solvent curable composition may have suitable (e.g., excellent) processability.

Polymerizable Monomer

The polymerizable monomer having the carbon-carbon double bond at the terminal end and having the vapor pressure of about $1 \times 10^{-5}$ mmHg to about $1 \times 10^{-4}$ mmHg may be included in an amount of 40 wt % to 80 wt % based on a total amount of the non-solvent curable composition. For example, the polymerizable monomer having the carbon-carbon double bond at the terminal end and having the vapor pressure of about $1 \times 10^{-5}$ mmHg to about $1 \times 10^{-4}$ mmHg may be included in an amount of 50 wt % to 80 wt % based on a total amount of the non-solvent curable composition. When the polymerizable monomer having the carbon-carbon double bond at the terminal end and having the vapor pressure of about $1 \times 10^{-5}$ mmHg to about $1 \times 10^{-4}$ mmHg is included within these ranges, a non-solvent curable composition having a viscosity capable of (e.g., suitable for) ink-jetting may be prepared and the quantum dots in the prepared non-solvent curable composition may have improved dispersibility, thereby improving optical characteristics.

In addition, the polymerizable monomer may have a vapor pressure at about 20° C. to about 25° C. of less than or equal to about $1\times10^{-4}$ mmHg, for example, about $1\times10^{-5}$ mmHg to about $1\times10^{-4}$ mmHg. The polymerizable monomer is to have the vapor pressure of the above described range so that the non-solvent curable composition according to an embodiment may provide (e.g., secure) improved photo-cure rate and film residue rate concurrently or simultaneously. For example, when the polymerizable monomer has a vapor pressure (at about 20° C. to about 25° C.) of greater than about $1\times10^{-4}$ mmHg, there may be no improvement in either the photo-cure rate or the film residue rate, while when the polymerizable monomer has a vapor pressure of less than $1\times10^{-5}$ mmHg (at about 20° C. to about 25° C.), ink jetting properties at room temperature may be deteriorated.

For example, the non-solvent curable composition according to an embodiment may have a photo-cure rate of greater than or equal to about 90% and a film residue rate of greater than or equal to about 80% after 60 minutes after application when photocuring after application on a substrate with a thickness of about 2 μm to about 20 μm. That is, the non-solvent curable composition may have a photo-cure rate of greater than or equal to about 90% after being applied on a substrate at a thickness of about 2 μm to about 20 μm and photocured, and a film residue rate of greater than or equal to about 80% at 60 minutes after being applied on a substrate at a thickness of about 2 μm to about 20 μm.

For example, the polymerizable monomer having the carbon-carbon double bond at the terminal end and having the vapor pressure of about $1\times10^{-5}$ mmHg to about $1\times10^{-4}$ mmHg may be represented by Chemical Formula 15, but the present disclosure is not necessarily limited thereto.

Chemical Formula 15

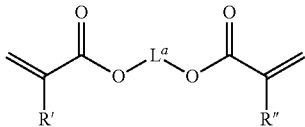

In Chemical Formula 15,
R' and R" are each independently a hydrogen atom or a substituted or unsubstituted C1 to C20 alkyl group, and
$L^a$ is a substituted or unsubstituted C5 to C20 alkylene group.

In addition, together with the polymerizable monomer having the carbon-carbon double bond at the terminal end and having the vapor pressure of about $1\times10^{-5}$ mmHg to about $1\times10^{-4}$ mmHg, a suitable (e.g., generally-utilized) monomer of a related art thermosetting or photocurable composition may be further included. For example, the monomer may further include an oxetane-based compound such as bis[1-ethyl(3-oxetanyl)]methyl ether, and/or the like.

Polymerization Initiator

A non-solvent curable composition according to an embodiment may further include a polymerization initiator, for example, a photopolymerization initiator, a thermal polymerization initiator, or a combination thereof.

The photopolymerization initiator is a suitable (e.g., generally-utilized) initiator for a photosensitive resin composition, for example, an acetophenone-based compound, a benzophenone-based compound, a thioxanthone-based compound, a benzoin-based compound, a triazine-based compound, an oxime-based compound, an aminoketone-based compound, and/or the like, but the present disclosure is not necessarily limited thereto.

Examples of the acetophenone-based compound may be 2,2'-diethoxy acetophenone, 2,2'-dibutoxy acetophenone, 2-hydroxy-2-methylpropiophenone, p-t-butyltrichloro acetophenone, p-t-butyldichloro acetophenone, 4-chloro acetophenone, 2,2'-dichloro-4-phenoxy acetophenone, 2-methyl-1-(4-(methylthio)phenyl)-2-morpholinopropan-1-one, 2-benzyl-2-dimethylamino-1-(4-morpholinophenyl)-butan-1-one, and/or the like.

Examples of the benzophenone-based compound may be benzophenone, benzoyl benzoate, benzoyl methyl benzoate, 4-phenyl benzophenone, hydroxybenzophenone, acrylated benzophenone, 4,4'-bis(dimethyl amino)benzophenone, 4,4'-bis(diethylamino)benzophenone, 4,4'-dimethylamino) benzophenone, 4,4'-dichlorobenzophenone, 3,3'-dimethyl-2-methoxybenzophenone, and/or the like.

Examples of the thioxanthone-based compound may be thioxanthone, 2-methylthioxanthone, isopropyl thioxanthone, 2,4-diethyl thioxanthone, 2,4-diisopropyl thioxanthone, 2-chlorothioxanthone, and/or the like.

Examples of the benzoin-based compound may be benzoin, benzoin methyl ether, benzoin ethyl ether, benzoin isopropyl ether, benzoin isobutyl ether, benzyldimethylketal, and/or the like.

Examples of the triazine-based compound may be 2,4,6-trichloro-s-triazine, 2-phenyl-4,6-bis(trichloromethyl)-s-triazine, 2-(3',4'-dimethoxystyryl)-4,6-bis(trichloromethyl)-s-triazine, 2-(4'-methoxynaphthyl)-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-biphenyl-4,6-bis(trichloro methyl)-s-triazine, bis(trichloromethyl)-6-styryl-s-triazine, 2-(naphthol-yl)-4,6-bis(trichloromethyl)-s-triazine, 2-(4-methoxynaphtho1-yl)-4,6-bis(trichloromethyl)-s-triazine, 2-4-bis(trichloromethyl)-6-piperonyl-s-triazine, 2-4-bis(trichloromethyl)-6-(4-methoxystyryl)-s-triazine, and/or the like.

Examples of the oxime-based compound may be O-acyloxime-based compound, 2-(O-benzoyloxime)-1-[4-(phenylthio)phenyl]-1,2-octandione, 1-(O-acetyloxime)-1-[9-ethyl-6-(2-methylbenzoyl)-9H-carbazol-3-yl]ethanone, O-ethoxycarbonyl-α-oxyamino-1-phenylpropan-1-one, and/or the like. Non-limiting specific examples of the O-acyloxime-based compound may be 1,2-octandione, 2-dimethylamino-2-(4-methylbenzyl)-1-(4-morpholin-4-yl-phenyl)-butan-1-one, 1-(4-phenylsulfanyl phenyl)-butane-1,2-dione-2-oxime-O-benzoate, 1-(4-phenylsulfanyl phenyl)-octane-1,2-dione-2-oxime-O-benzoate, 1-(4-phenylsulfanyl phenyl)-octan-1-oneoxime-O-acetate, 1-(4-phenylsulfanyl phenyl)-butan-1-oneoxime-O-acetate, and/or the like.

Examples of the aminoketone-based compound may be 2-benzyl-2-dimethylamino-1-(4-morpholinophenyl)-butan-1-one, and/or the like.

The photopolymerization initiator may further include a carbazole-based compound, a diketone-based compound, a sulfonium borate-based compound, a diazo-based compound, an imidazole-based compound, a biimidazole-based compound, and/or the like, besides the compounds described above.

The photopolymerization initiator may be utilized with a photosensitizer capable of causing a chemical reaction by absorbing light and becoming excited and then, transferring its energy.

Examples of the photosensitizer may be tetraethylene glycol bis-3-mercapto propionate, pentaerythritol tetrakis-3-mercapto propionate, dipentaerythritol tetrakis-3-mercapto propionate, and/or the like.

Examples of the thermal polymerization initiator may be peroxide, such as benzoyl peroxide, dibenzoyl peroxide, lauryl peroxide, dilauryl peroxide, di-tert-butyl peroxide, cyclohexane peroxide, methyl ethyl ketone peroxide, hydroperoxide (e.g., tert-butyl hydroperoxide, cumene hydroperoxide), dicyclohexyl peroxydicarbonate, t-butyl peroxybenzoate, and/or the like; azo polymerization initiators, such as 2,2-azo-bis(isobutyronitrile), 2,2'-azobis-2-methylpropiononitrile, and/or the like, but the present disclosure is not necessarily limited thereto and any suitable thermal polymerization initiator (e.g., of which is well known in the art) may be utilized.

The polymerization initiator may be included in an amount of about 0.1 wt % to about 5 wt %, for example, about 1 wt % to about 4 wt %, based on a total amount of a non-solvent curable composition. When the polymerization initiator is included in these ranges, it is possible to obtain suitable (e.g., excellent) reliability due to sufficient curing (during exposure or thermal curing) and to reduce or prevent deterioration of transmittance (due to non-reaction initiators), thereby reducing or preventing deterioration of optical characteristics of the quantum dot.

Light Diffusing Agent (or Light Diffusing Agent Dispersion)

The non-solvent curable composition according to an embodiment may further include a light diffusing agent.

For example, the light diffusing agent may include barium sulfate ($BaSO_4$), calcium carbonate ($CaCO_3$), titanium dioxide ($TiO_2$), zirconia ($ZrO_2$), or a combination thereof.

The light diffusing agent may reflect unabsorbed light in the aforementioned quantum dots and allow the quantum dots to absorb the reflected light again. That is, the light diffusing agent may increase an amount of light absorbed by the quantum dots and increase photo-conversion efficiency of the curable composition.

The light diffusing agent may have an average particle diameter ($D_{50}$) of about 150 nm to about 250 nm, and for example, about 180 nm to about 230 nm. When the average particle diameter of the light diffusing agent is within these ranges, it may have a better light diffusing effect and increase photo-conversion efficiency.

The light diffusing agent may be included in an amount of about 1 wt % to about 20 wt %, for example, about 5 wt % to about 10 wt %, based on a total amount of a non-solvent curable composition. When the light diffusing agent is included in an amount of less than about 1 wt % based on a total amount of the non-solvent curable composition, it is difficult to expect a photo-conversion efficiency improvement effect due to the usage of the light diffusing agent, while when it is included in an amount of greater than about 20 wt %, there is a possibility that the quantum dots may be precipitated.

Other Additives

For stability and dispersion improvement of the quantum dots, the non-solvent curable composition according to an embodiment may further include a polymerization inhibitor.

The polymerization inhibitor may include a hydroquinone-based compound, a catechol-based compound, or a combination thereof, but the present disclosure is not necessarily limited thereto. When the non-solvent ink composition according to an embodiment further includes the hydroquinone-based compound, the catechol-based compound, or the combination thereof, room temperature cross-linking during exposure after coating the non-solvent ink composition may be prevented or inhibited.

For example, the hydroquinone-based compound, the catechol-based compound, or the combination thereof may be hydroquinone, methyl hydroquinone, methoxyhydroquinone, t-butyl hydroquinone, 2,5-di-t-butyl hydroquinone, 2,5-bis(1,1-dimethylbutyl) hydroquinone, 2,5-bis(1,1,3,3-tetramethylbutyl) hydroquinone, catechol, t-butyl catechol, 4-methoxyphenol, pyrogallol, 2,6-di-t-butyl-4-methylphenol, 2-naphthol, tris(N-hydroxy-N-nitrosophenylaminato-O, O')aluminum, or a combination thereof, but the present disclosure is not necessarily limited thereto.

The hydroquinone-based compound, the catechol-based compound, or the combination thereof may be utilized in a form of dispersion. The polymerization inhibitor in a form of dispersion may be included in an amount of about 0.001 wt % to about 3 wt %, for example, about 0.1 wt % to about 2 wt %, based on a total amount of the non-solvent ink composition. When the polymerization inhibitor is included in these ranges, passage of time at room temperature may be solved and simultaneously sensitivity deterioration and surface delamination phenomenon may be reduced or prevented. That is, when the polymerization inhibitor is included in these ranges, the room temperature stability of the non-solvent curable composition may be improved, and reduction in curing sensitivity and delamination of the coating layer may both be reduced or prevented.

In addition, the non-solvent curable composition according to an embodiment may further include malonic acid; 3-amino-1,2-propanediol; a silane-based coupling agent; a leveling agent; a fluorine-based surfactant; or a combination thereof in order to improve heat resistance and reliability.

For example, the non-solvent curable composition according to embodiment may further include a silane-based coupling agent having a reactive substituent such as a vinyl group, a carboxyl group, a methacryloxy group, an isocyanate group, an epoxy group and/or the like in order to improve close contacting (e.g., adhesion) properties with a substrate.

Examples of the silane-based coupling agent may be trimethoxysilyl benzoic acid, γ-methacryl oxypropyl trimethoxysilane, vinyl triacetoxysilane, vinyl trimethoxysilane, γ-isocyanate propyl triethoxysilane, γ-glycidoxy propyl trimethoxysilane, β-epoxycyclohexylethyltrimethoxysilane, and/or the like, and the silane-based coupling agent may be utilized alone or in a mixture of two or more.

The silane-based coupling agent may be utilized in an amount of about 0.01 parts by weight to about 10 parts by weight based on 100 parts by weight of the non-solvent curable composition. When the silane-based coupling agent is included within this range, close contacting (e.g., adhesion) properties, storage capability, and/or the like are suitable (e.g., excellent).

In addition, the non-solvent curable composition may further include a surfactant, for example, a fluorine-based surfactant, as needed in order to improve coating properties and inhibit generation of spots, that is, to improve leveling performance.

The fluorine-based surfactant may have a low weight average molecular weight of about 4,000 g/mol to about 10,000 g/mol, and for example, about 6,000 g/mol to about 10,000 g/mol. In addition, the fluorine-based surfactant may have a surface tension of 18 mN/m to 23 mN/m (measured in a 0.1% polyethylene glycol monomethylether acetate (PGMEA) solution). When the fluorine-based surfactant has a weight average molecular weight and a surface tension within these ranges, leveling performance may be further improved, and suitable (e.g., excellent) characteristics may be provided when slit coating as high speed coating is applied because less film defects may be generated by preventing or reducing a spot generation during the high speed coating and suppressing a vapor generation. That is, when the fluorine-based surfactant has a weight average molecular weight and a surface tension within the ranges described above, leveling performance may be further improved, and when coated utilizing high speed slit coating, spot generation and vapor generation may be reduced or prevented, thereby reducing film defects.

Examples of the fluorine-based surfactant may be, BM-1000®, and BM-1100® (BM Chemie Inc.); MEGAFACE F 142D®, F 172®, F 173®, and F 183® Dainippon Ink Kagaku Kogyo Co., Ltd.); FULORAD FC-135®, FULORAD FC-170C®, FULORAD FC-430®, and FULORAD FC-431® (Sumitomo 3M Co., Ltd.); SURFLON S-112®, SURFLON S-113®, SURFLON S-131®, SURFLON S-141®, and SURFLON S-145® (ASAHI Glass Co., Ltd.); and SH-28PA®, SH-190®, SH-193®, SZ-6032®, and SF-8428®, and the like (Toray Silicone Co., Ltd.); and F-482, F-484, F-478, F-554 and the like of DIC Co., Ltd.

In addition, the non-solvent curable composition according to an embodiment may include a silicone-based surfactant in addition to the fluorine-based surfactant. Specific examples of the silicone-based surfactant may be TSF400, TSF401, TSF410, TSF4440, and/or the like of Toshiba silicone Co., Ltd., but the present disclosure is not limited thereto.

The surfactant may be included in an amount of about 0.01 parts by weight to about 5 parts by weight, for example, about 0.1 parts by weight to about 2 parts by weight, based on 100 parts by weight of the non-solvent curable composition. When the surfactant is included within these ranges, less foreign materials are produced (or included) in a sprayed ink.

In addition, the non-solvent curable composition according to an embodiment may further include other additives such as an antioxidant, a stabilizer, and/or the like in a set or predetermined amount, unless desired properties are deteriorated (when these additives are included).

Another embodiment provides a cured layer manufactured utilizing the aforementioned non-solvent curable composition, a color filter including the cured layer, and a display device including cured layer and/or the color filter.

One of the methods of manufacturing the cured layer may include coating the aforementioned non-solvent curable composition on a substrate utilizing an ink-jet spraying method to form a pattern (S1); and curing the pattern (S2).

(S1) Formation of Pattern

The non-solvent curable composition may desirably be coated to be about 0.5 μm to about 20 μm in thickness on a substrate in an ink-jet spraying method. The ink-jet spraying method may form a pattern by spraying a single color per each nozzle and thus repeating the spraying as many times as the number of colors needed, but the pattern may be formed by concurrently or simultaneously spraying the number of colors needed through each ink-jet nozzle in order to reduce the number of processes. That is, the pattern may be formed by concurrently spraying the number of colors needed through a plurality of nozzles (e.g., each containing one of the colors).

(S2) Curing

The obtained pattern is cured to obtain a pixel. Herein, the curing method may be thermal curing and/or photocuring process. The thermal curing process may be performed at greater than or equal to about 100° C., desirably, in a range of about 100° C. to about 300° C., and more desirably, in a range of about 160° C. to about 250° C. The photocuring process may include irradiating an actinic ray such as a UV ray of about 190 nm to about 450 nm, for example, about 200 nm to about 500 nm. The irradiating is performed by utilizing a light source such as a mercury lamp (with a low pressure, a high pressure, or an ultrahigh pressure), a metal halide lamp, an argon gas laser, and/or the like. An X ray, an electron beam, and/or the like may also be utilized as needed.

The other method of manufacturing the cured layer may include manufacturing a cured layer utilizing the aforementioned non-solvent curable composition by a lithographic method as follows.

(1) Coating and Film Formation

The non-solvent curable composition is coated to have a desired thickness, for example, a thickness from about 2 μm to about 10 μm, on a substrate (which has undergone a set or predetermined pretreatment), utilizing a spin coating method, a slit coating method, a roll coating method, a screen-printing method, an applicator method, and/or the like. Then, the coated substrate is heated at a temperature of about 70° C. to about 90° C. for 1 minute to 10 minutes to remove a solvent and to form a film.

(2) Exposure

The resultant film is irradiated by an actinic ray such as a UV ray of about 190 nm to about 450 nm, for example, about 200 nm to about 500 nm, through a mask with a set or predetermined shape to form a desired pattern. The irradiation is performed by utilizing a light source such as a mercury lamp (with a low pressure, a high pressure, or an ultrahigh pressure), a metal halide lamp, an argon gas laser, and/or the like. An X ray, an electron beam, and/or the like may also be utilized as needed.

Exposure process utilizes, for example, a light dose of 500 mJ/cm$^2$ or less (with a 365 nm sensor) when a high pressure mercury lamp is utilized. However, the light dose may vary depending on kinds of each component of the curable composition, their combination ratio, and/or a dry film thickness.

(3) Development

After the exposure process, an alkali aqueous solution is utilized to develop the exposed film by dissolving and removing an unnecessary part except the exposed part, thereby forming an image pattern. In other words, when the alkali developing solution is utilized for the development, a non-exposed region is dissolved, and an image color filter pattern is formed.

(4) Post-Treatment

The developed image pattern may be heated again or irradiated by an actinic ray and/or the like for curing, in order to accomplish suitable (e.g., excellent) quality in terms of heat resistance, light resistance, close contacting properties, crack-resistance, chemical resistance, high strength, storage stability, and/or the like.

Hereinafter, the subject matter of the present disclosure is illustrated in more detail with reference to examples. These examples, however, are not in any sense to be interpreted as limiting the scope of the present disclosure.

Preparation of Surface-Modified Quantum Dot Dispersion

Synthesis Method of Chemical Formula A 50 g of thioglycolic acid, 91 g of 2-[2-(2-methoxyethoxy) ethoxy]-ethanol, and 10.27 g of p-toluenesulfonic acid monohydrate were put in a flask and then, evenly dispersed in 500 mL of cyclohexane under a nitrogen atmosphere. An injection hole of the flask was connected to a dean stark, and a condenser was connected thereto. The reaction flask was stirred for a set or predetermined time, while heated at 80° C., and then, whether or not water has been gathered inside the dean stark was examined. After confirming that water has gathered, the stirring was additionally performed for 12 hours. When 0.54 mol of the water has come out, the reaction was completed. Ethyl acetate and an excessive amount of water were added to the reactants for extraction and neutralization, a vacuum evaporator was utilized for concentration, and then, a final product (i.e., the ligand represented by Chemical Formula A) therefrom was dried in a vacuum oven.

Preparation Example 1

A magnetic bar was added to a 3-neck round-bottomed flask and a quantum dot-CHA (cyclohexyl acetate) solution (solid content: 26 wt % to 27 wt %) was weighed and added. The ligand represented by Chemical Formula A was added thereto.

The mixture was well mixed for 1 minute and then, stirred at 80° C. under a nitrogen atmosphere. When the reaction was completed, the resultant was cooled down to room temperature, and added to cyclohexane to get precipitates. The precipitated quantum dot powder was separated from the cyclohexane through centrifugation. A clear solution was poured out and discarded, and then, the precipitates were sufficiently dried in a vacuum oven for one day to obtain surface-modified quantum dots.

The surface-modified quantum dots were added to 1,6-hexanediol diacrylate (1,6-hexanediol diacrylate, Miwon Commercial Co., Ltd) (vapor pressure at 20° C.: $4 \times 10^{-5}$ mmHg) and the mixture was stirred for 12 hours to obtain surface-modified quantum dot dispersion.

Chemical Formula A

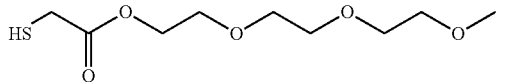

Synthesis Method of Chemical Formula E 79 g of p-toluenesulfonic chloride and 150 mL of THF dispersion were slowly injected to a mixed solution of 100 g of pentaethylene glycol monomethyl ether, 14.3 g of NaOH, 500 mL of THF, and 100 mL of $H_2O$ at 0° C. After 30 minutes, the injection is completed, the obtained mixture was stirred for about 12 hours. When the reaction was completed, the resultant was purified through extraction, neutralization, and concentration and then, sufficiently dried in a vacuum oven. The obtained product was put in a flask and dissolved in ethanol under a nitrogen atmosphere. 3 to 5 equivalents of thiourea was added thereto and then, stirred at 100° C. for 12 hours. 20 equivalents of a NaOH diluent was injected into the reactants and then, further stirred for 5 hours. When the reaction was completed, the resultant was washed several times, extracted, and neutralized with water and a hydrochloric acid diluent and then, concentrated and sufficiently dried in a vacuum oven to obtain the product (i.e., the ligand represented by Chemical Formula E).

Preparation Example 2

Surface-modified quantum dot dispersion was obtained according to the same method as Preparation Example 1 except that the ligand represented by Chemical Formula E was utilized instead of the ligand represented by Chemical Formula A.

Chemical Formula E

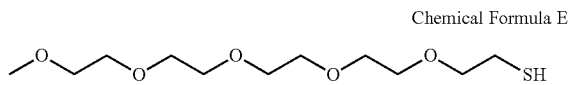 [SMILES: COCCOCCOCCOCCOCCS]

Synthesis Method of Chemical Formula K 260 g of PH-4 (Hannon Chemicals Inc.) and 140 g of allylsuccinic anhydride were stirred at 80° C. for 20 hours to thereby manufacture the ligand represented by Chemical Formula K.

Preparation Example 3

Surface-modified quantum dot dispersion was obtained according to the same method as Preparation Example 1 except that the ligand represented by Chemical Formula K was utilized instead of the ligand represented by Chemical Formula A.

Chemcial Formula K

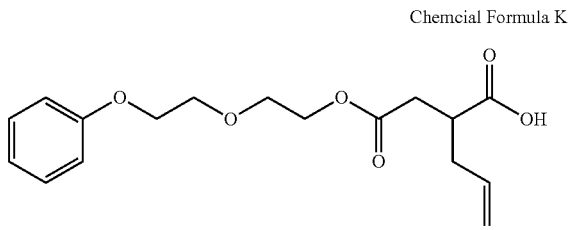 [SMILES: C=CCC(CC(=O)OCCOCCOc1ccccc1)C(=O)O]

Comparative Preparation Example 1

A surface-modified quantum dot dispersion was prepared according to the same method as Preparation Example 1 except that 2-(2-vinyloxyethoxy)ethyl acrylate (Miwon Commercial Co., Ltd) (vapor pressure at 20° C.: $1 \times 10^{-2}$ mmHg) was utilized instead of 1,6-hexanediol diacrylate.

Comparative Preparation Example 2

A surface-modified quantum dot dispersion was prepared according to the same method as Preparation Example 1 except that 1,4-butanediol dimethacrylate (Miwon Commercial Co., Ltd) (vapor pressure at 20° C.: $2 \times 10^{-3}$ mmHg) was utilized instead of 1,6-hexanediol diacrylate.

Comparative Preparation Example 3

A surface-modified quantum dot dispersion was prepared according to the same method as Preparation Example 1 except that 2-phenoxyethyl acrylate (Miwon Commercial Co., Ltd) (vapor pressure at 20° C.: $1.5 \times 10^{-3}$ mmHg) was utilized instead of 1,6-hexanediol diacrylate.

Evaluation 1: Dispersibility

The particle size of each quantum dot dispersion according to Preparation Example 1 to Preparation Example 3 and Comparative Preparation Example 1 to Comparative Preparation Example 3 was measured three times by utilizing a micro particle size analyzer to obtain an average particle size, and the results are shown in Table 1.

TABLE 1

| Particle size (nm) | Preparation Example 1 | Preparation Example 2 | Preparation Example 3 | Comparative Preparation Example 1 | Comparative Preparation Example 2 | Comparative Preparation Example 3 |
|---|---|---|---|---|---|---|
| D50 | 11 | 14 | 18 | 14 | 26 | 22 |
| D90 | 19 | 38 | 45 | 38 | 68 | 138 |

Referring to Table 1, each of the quantum dot dispersion according to Preparation Example 1 to Preparation Example 3 exhibited a narrow particle size distribution, which shows that the quantum dots were well dispersed in the polymerizable monomer, but each of the quantum dot dispersion according to Comparative Preparation Example 2 to Comparative Preparation Example 3 exhibited wide particle size distributions, which shows that the quantum dots were not well dispersed in the polymerizable monomer.

Preparation of Non-Solvent Curable Composition

Example 1

The dispersion according to Preparation Example 1 was weighed and then, mixed and diluted with 1,6-hexanediol diacrylate, and a polymerization inhibitor (methylhydroquinone, Tokyo Chemical Industry Co., Ltd.; 5 wt %) was added thereto and then, stirred for 5 minutes. Subsequently, a photoinitiator (ethyl(2,4,6-trimethylbenzoyl) phenylphosphinate, IGM Resins) was injected thereinto, and a light diffusing agent ($TiO_2$; SDT89, Iridos Co., Ltd.) was added thereto. The entire dispersion was stirred for 1 hour to prepare a non-solvent curable composition. 8 wt % of the quantum dots, 80 wt % of 1,6-hexanediol diacrylate, 1 wt % of the polymerization inhibitor, 3 wt % of the photoinitiator, and 8 wt % of the light diffusing agent were included based on a total amount of the non-solvent curable composition.

Example 2

A non-solvent curable composition was prepared according to the same method as Example 1 except that the dispersion according to Preparation Example 2 was utilized instead of the dispersion according to Preparation Example 1.

Example 3

A non-solvent curable composition was prepared according to the same method as Example 1 except that the dispersion according to Preparation Example 3 was utilized instead of the dispersion according to Preparation Example 1.

Example 4

A non-solvent curable composition was prepared according to the same method as Example 2 except that 48 wt % of the quantum dots, 40 wt % of 1,6-hexanediol diacrylate, 1 wt % of the polymerization inhibitor, 3 wt % of the photoinitiator, and 8 wt % of the light diffusing agent based on a total amount of the non-solvent curable composition were utilized.

Example 5

A non-solvent curable composition was prepared according to the same method as Example 2 except that 50 wt % of the quantum dots, 38 wt % of 1,6-hexanediol diacrylate, 1 wt % of the polymerization inhibitor, 3 wt % of the photoinitiator, and 8 wt % of the light diffusing agent based on a total amount of the non-solvent curable composition were utilized.

Example 6

A non-solvent curable composition was prepared according to the same method as Example 2 except that 6 wt % of the quantum dots, 82 wt % of 1,6-hexanediol diacrylate, 1 wt % of the polymerization inhibitor, 3 wt % of the photoinitiator, and 8 wt % of the light diffusing agent based on a total amount of the non-solvent curable composition were utilized.

Comparative Example 1

A non-solvent curable composition was prepared according to the same method as Example 1 except that the dispersion of Comparative Preparation Example 1 instead of the dispersion of Preparation Example 1 and 2-(2-vinyloxyethoxy)ethyl acrylate instead of 1,6-hexanediol diacrylate were utilized.

Comparative Example 2

A non-solvent curable composition was prepared according to the same method as Example 1 except that the dispersion of Comparative Preparation Example 2 instead of the dispersion of Preparation Example 1 and 1,4-butanediol dimethacrylate instead of 1,6-hexanediol diacrylate were utilized.

Comparative Example 3

A non-solvent curable composition was prepared according to the same method as Example 1 except that the dispersion of Comparative Preparation Example 3 instead of the dispersion of Preparation Example 1 and 2-phenoxyethyl acrylate instead of 1,6-hexanediol diacrylate were utilized.

Evaluation 2: Evaluation of Photo-Cure Rate and Film Residue Rate

Each non-solvent curable composition according to Example 1 to Example 6 and Comparative Example 1 to Comparative Example 3 was dropped (e.g., applied) by utilizing an ink-jet printer (Omnijet 100, UniJet) on a substrate having a partition wall formed thereon with a volume of 9 picoliter/drop at a certain amount. The film residue rate was observed with a microscope (VK 9170, KEYENCE) according to the latency time (e.g., amount of time passed after each non-solvent curable composition was dropped on the substrate), and the film residue rate immediately after 60 minutes from dropping was shown in Table 2. That is, the height of the film after 60 minutes from the time of the deposition divided by the original height at the time of the deposition is calculated as the film residue rate.

Intensities of the absorption peaks at around 1635 $cm^{-1}$ (C=C) and at around 1720 $cm^{-1}$ (C=O) were measured for each of the non-solvent curable compositions utilizing FT-IR (NICOLET 4700, Thermo). The non-solvent curable compositions were each coated on a glass substrate by spin coating at a thickness of 15 μm and irradiated with UV of 5000 mJ/cm² and cured to obtain specimens of 5 cm×5 cm×15 μm (width×length×thickness). The cured films were collected and intensities of absorption peaks at around 1635 cm⁻¹ (C═C) and at around 1720 cm⁻¹ (C═O) were measured utilizing FT-IR (NICOLET 4700, Thermo). The photo-cure rates were calculated according to Equation 1, and the values are shown in Table 2.

$$\text{Photo-cure rate (\%)} = |1-(A/B)| \times 100 \qquad \text{Equation 1}$$

In Equation 1, A is a ratio of intensity of the absorption peaks at around 1635 cm⁻¹ to intensity of the absorption peak at around 1720 cm⁻¹ for the cured film and B is a ratio of intensity of the absorption peak at around 1635 cm⁻¹ to the intensity of the absorption peak at around 1720 cm⁻¹ for a non-solvent curable composition (i.e., before the composition is cured).

TABLE 2

(unit: %)

|  | Photo-cure rate | Film residue rate |
|---|---|---|
| Example 1 | 92 | 82 |
| Example 2 | 91 | 80 |
| Example 3 | 91 | 80 |
| Example 4 | 90 | 80 |
| Example 5 | 89 | 75 |
| Example 6 | 88 | 78 |
| Comparative Example 1 | 98 | 0 |
| Comparative Example 2 | 40 | 59 |
| Comparative Example 3 | 92 | 72 |

As seen in Table 2, the non-solvent curable compositions according to embodiments of the present disclosure may achieve suitable (e.g., excellent) photo-cure rates and suitable (e.g., excellent) film residue rates concurrently or simultaneously with the progress of the color filter process (e.g., improved color conversion properties).

Expressions such as "at least one of" or "at least one selected from" when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration. As used herein, the term "substantially," "about," and similar terms are used as terms of approximation and not as terms of degree, and are intended to account for the inherent deviations in measured or calculated values that would be recognized by those of ordinary skill in the art. Moreover, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112, first paragraph, or 35 U.S.C. § 112(a), and 35 U.S.C. § 132(a).

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the subject matter of the present disclosure has been described in connection with what is presently considered to be practical example embodiments, it is to be understood that the subject matter of the present disclosure is not limited to the disclosed embodiments, but, on the contrary, is intended to cover various modifications and equivalent arrangements included within the spirit and scope of the appended claims, and equivalents thereof. Therefore, the aforementioned embodiments should be understood to be exemplary but not limiting the present disclosure in any way.

What is claimed is:

1. A non-solvent curable composition comprising
    a quantum dot, and
    a polymerizable monomer having a carbon-carbon double bond at a terminal end of the polymerizable monomer, the polymerizable monomer having a vapor pressure of about 1×10⁻⁵ mmHg to about 1×10⁻⁴ mmHg.

2. The non-solvent curable composition of claim 1, wherein
    the polymerizable monomer is about 40 wt % to about 80 wt % in amount based on a total weight of the non-solvent curable composition, and
    the non-solvent curable composition does not contain any solvent.

3. The non-solvent curable composition of claim 1, wherein the polymerizable monomer is represented by Chemical Formula 15:

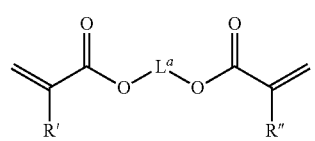

Chemical Formula 15 wherein, in Chemical Formula 15,
R' and R" are each independently a hydrogen atom or a substituted or
unsubstituted C1 to C20 alkyl group, and
L$^a$ is a substituted or unsubstituted C5 to C20 alkylene group.

4. The non-solvent curable composition of claim 1, wherein the quantum dot is a quantum dot surface-modified with one or more of compounds represented by Chemical Formula 1 to Chemical Formula 14:

Chemical Formula 1

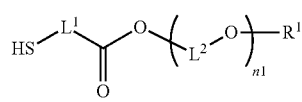

Chemical Formula 2

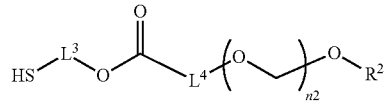

Chemical Formula 3

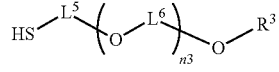

Chemical Formula 4

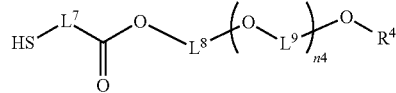

Chemical Formula 5

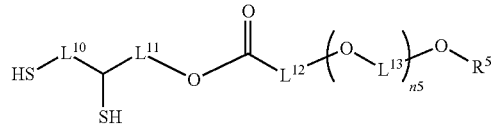

Chemical Formula 6

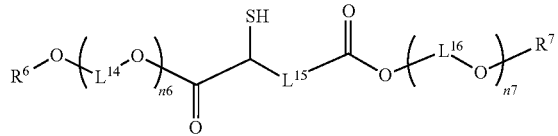

wherein, in Chemical Formula 1 to Chemical Formula 6,
$R^1$ to $R^7$ are each independently a substituted or unsubstituted C1 to C10 alkyl group or a substituted or unsubstituted C6 to C20 aryl group,
$L^1$ to $L^{16}$ are each independently a substituted or unsubstituted C1 to C10 alkylene group, and
n1 to n7 are each independently an integer of 0 to 10, Chemical Formula 7

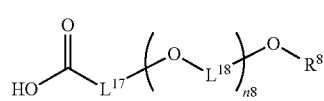

Chemical Formula 8

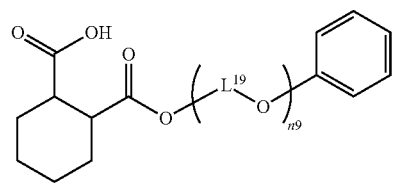

Chemical Formula 9

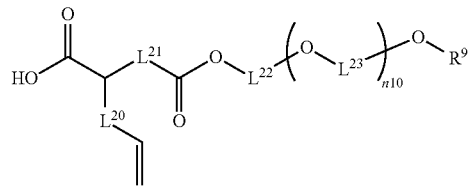

wherein, in Chemical Formula 7 to Chemical Formula 9,
$R^8$ and $R^9$ are each independently a substituted or unsubstituted C1 to C10 alkyl group,
$L^{17}$ to $L^{23}$ are each independently a substituted or unsubstituted C1 to C10 alkylene group, and
n8 to n10 are each independently an integer of 0 to 10, Chemical Formula 10

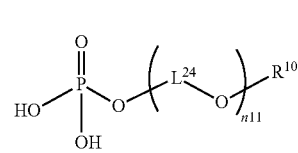

Chemical Formula 11

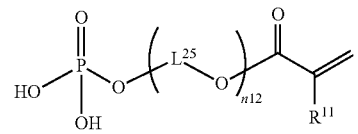

Chemical Formula 12

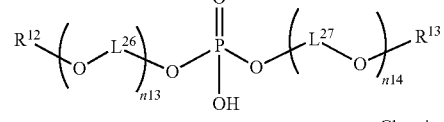

Chemical Formula 13

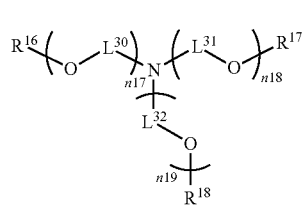

wherein, in Chemical Formula 10 to Chemical Formula 13,
$R^{19}$ to $R^{15}$ are each independently a hydrogen atom or a substituted or unsubstituted C1 to C10 alkyl group,
$L^{24}$ to $L^{29}$ are each independently a substituted or unsubstituted C1 to C10 alkylene group, and
n11 to n16 are each independently an integer of 0 to 10, Chemical Formula 14 wherein, in Chemical Formula 14,
$R^{16}$ to $R^{18}$ are each independently a substituted or unsubstituted C1 to C10 alkyl group,
$L^{30}$ to $L^{32}$ are each independently a substituted or unsubstituted C1 to C10 alkylene group, and
n17 to n19 are each independently an integer of 0 to 10.

5. The non-solvent curable composition of claim 1, wherein the quantum dot has a maximum fluorescence emission wavelength at about 500 nm to about 680 nm.

6. The non-solvent curable composition of claim 1, wherein the non-solvent curable composition further comprises a polymerization initiator, a light diffusing agent, or a combination thereof.

7. The non-solvent curable composition of claim 6, wherein the light diffusing agent is barium sulfate, calcium carbonate, titanium dioxide, zirconia, or a combination thereof.

8. The non-solvent curable composition of claim 1, wherein the non-solvent curable composition further comprises a polymerization inhibitor; malonic acid; 3-amino-1, 2-propanediol; a silane-based coupling agent; a leveling agent; a fluorine-based surfactant; or a combination thereof.

9. The non-solvent curable composition of claim 1, wherein the non-solvent curable composition has a photocure rate of greater than or equal to about 90% after being applied on a substrate at a thickness of about 2 μm to about 20 μm and photocured.

10. The non-solvent curable composition of claim 1, wherein the non-solvent curable composition has a film residue rate of greater than or equal to about 80% at 60 minutes after being applied on a substrate at a thickness of about 2 μm to about 20 μm.

11. A cured layer manufactured utilizing the non-solvent curable composition of claim 1.

12. A color filter comprising the cured layer of claim 11.

13. A display device comprising the color filter of claim 12.

14. A method of manufacturing a cured layer, the method comprising:
applying the non-solvent curable composition of claim 1 onto a substrate by an ink-jet method to form a pattern; and
curing the pattern.

15. The method of claim 14, wherein the curing comprises photocuring and/or thermal curing.

16. The non-solvent curable composition of claim 1, wherein the quantum dot is about 1 wt % to about 40 wt % in amount based on a total weight of the non-solvent curable composition.

17. The non-solvent curable composition of claim 1, wherein the non-solvent curable composition does not contain any solvent.

18. The non-solvent curable composition of claim 1, wherein the quantum dot comprises a red quantum dot and/or a green quantum dot.

19. The non-solvent curable composition of claim 2, wherein the quantum dot is about 1 wt % to about 40 wt % in amount based on the total weight of the non-solvent curable composition.

* * * * *

UNITED STATES PATENT AND TRADEMARK OFFICE
CERTIFICATE OF CORRECTION

PATENT NO. : 11,866,624 B2
APPLICATION NO. : 16/742857
DATED : January 9, 2024
INVENTOR(S) : Mi Jeong Choi et al.

It is certified that error appears in the above-identified patent and that said Letters Patent is hereby corrected as shown below:

In the Claims

In Column 26, Line 36, in Claim 4, delete "$R^{19}$" and insert -- $R^{10}$ --.

Signed and Sealed this
Thirtieth Day of April, 2024

Katherine Kelly Vidal
*Director of the United States Patent and Trademark Office*